United States Patent
Falk et al.

(12)

(10) Patent No.: US 9,904,789 B1
(45) Date of Patent: Feb. 27, 2018

(54) APPARATUS AND METHOD FOR FORMING A VOICE ENCRYPTED SIGNAL IN THE HEARING RANGE

(71) Applicant: Stealth Software Technologies, Inc., Los Angeles, CA (US)

(72) Inventors: Brett Falk, Philadelphia, PA (US); Quinn Grier, Manitoba (CA); Steve Naichia Lu, Torrance, CA (US); Rafail Ostrovsky, Los Angeles, CA (US); William E. Skeith, III, New York, NY (US)

(73) Assignee: Stealth Software Technologies, Inc., Los Angeles, CA (US)

( * ) Notice: Subject to any disclaimer, the term of this patent is extended or adjusted under 35 U.S.C. 154(b) by 226 days.

(21) Appl. No.: 15/069,649

(22) Filed: Mar. 14, 2016

Related U.S. Application Data

(60) Provisional application No. 62/133,197, filed on Mar. 13, 2015.

(51) Int. Cl.
*G06F 21/00* (2013.01)
*G06F 21/60* (2013.01)
*G10L 19/16* (2013.01)

(52) U.S. Cl.
CPC ............ *G06F 21/602* (2013.01); *G10L 19/16* (2013.01)

(58) Field of Classification Search
CPC ..................................................... G04F 21/602
USPC ........................................................ 380/252
See application file for complete search history.

(56) References Cited

U.S. PATENT DOCUMENTS 5,278,907 A * 1/1994 Snyder .................... H04K 1/04
380/260

* cited by examiner

*Primary Examiner* — Longbit Chai
(74) *Attorney, Agent, or Firm* — Cooley LLP

(57) ABSTRACT

A hardware module has a plug to interface with an audio channel of a speech communication device. A scrambler connected to the plug is configured to receive a local audio input signal and form an encrypted audio output signal in a human audible range that is applied to the audio channel of the speech communication device. The scrambler also receives a remote encrypted audio input signal in a human audible range and forms a remote audio output signal corresponding to the remote encrypted audio input signal.

15 Claims, 2 Drawing Sheets

APPARATUS AND METHOD FOR FORMING A VOICE ENCRYPTED SIGNAL IN THE HEARING RANGE

CROSS-REFERENCE TO RELATED APPLICATION

This application claims priority to U.S. Provisional Patent Application Ser. No. 62/133,197, filed Mar. 13, 2015, the contents of which are incorporated herein by reference.

FIELD OF THE INVENTION

This invention relates generally to voice communications in packet switched networks. More particularly, this invention relates to techniques for forming a voice encrypted signal in the hearing range to avoid digital filters used in packet switched networks.

BACKGROUND OF THE INVENTION

In order to conserve bandwidth, most modern communication channels employ filters that aggressively eliminate waveforms that are unlikely to be human speech, or are unlikely to be detected by the human ear (the human ear has a hearing range between 20 and 20,000 Hz). Thus encrypted content that is sent directly over such a channel will be dramatically altered or eliminated by these filters.

In view of the foregoing, it would be desirable to form a voice encrypted signal in the hearing range to avoid digital filters used in packet switched networks.

SUMMARY OF THE INVENTION

A hardware module has a plug to interface with an audio channel of a speech communication device. A scrambler connected to the plug is configured to receive a local audio input signal and form an encrypted audio output signal in a human audible range that is applied to the audio channel of the speech communication device. The scrambler also receives a remote encrypted audio input signal in a human audible range and forms a remote audio output signal corresponding to the remote encrypted audio input signal.

BRIEF DESCRIPTION OF THE FIGURES

The invention is more fully appreciated in connection with the following detailed description taken in conjunction with the accompanying drawings, in which.

Reference numerals refer to corresponding parts throughout the several views of the drawings.

DETAILED DESCRIPTION OF THE INVENTION

In order to bypass packet switched network filters, a voice scrambler is configured to encrypt a voice signal and then encode it with an error correcting code. The signal is then transformed so that it lies in the audible region that is minimally altered by network filters. On the receiving end, the process is reversed to recover the original audio signal.

Figure 1:
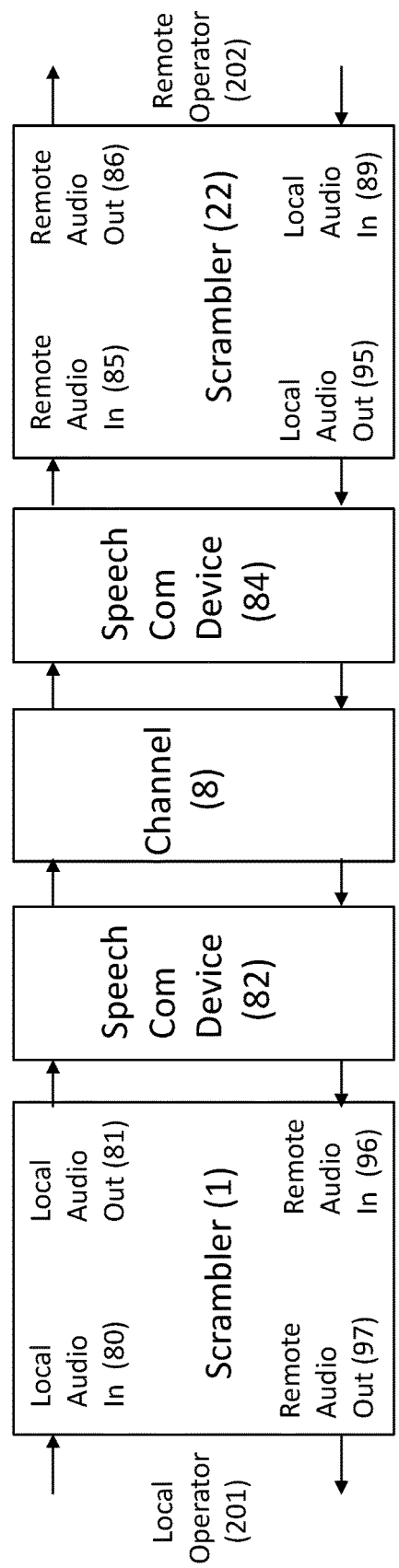
FIG. 1 illustrates a system utilized in accordance with an embodiment of the invention.

The invention is a stand-alone hardware device that plugs into the existing audio channel of a speech communication device (e.g., a Smartphone). The stand-alone hardware device is scrambler operative in the environment of FIG. 1. FIG. 1 illustrates a first scrambler 1 used by a local operator 201. The scrambler 1 is plugged into the audio channel of a first speech communication device 82. That is, the scrambler 1 includes a plug (not shown) to interface with an audio channel of the speech communication device 82. The first speech communication device 82 communicates with an audio channel 8 (e.g., the Internet). The communication is received by a second speech communication device 84, which applies the signal to its scrambler 22 for consumption by a remote operator 202.

An embodiment of the invention is a method for sending (digitally) encrypted data across a noisy channel that implements audio filtering so that the original audio signal can be decrypted and recovered by a receiver who shares a secret key with the sender. Key parameters are tuned, as discussed below, to accomplish this functionality.

FIG. 1 shows the overall workflow of two operators using two scramblers for secure speech communication. The local operator 201 holds a scrambler 1 and a preexisting speech communication device 82. The local operator 201 generates local audio input 80 (e.g., via a microphone) for the scrambler 1 and receives remote audio output 97 from the scrambler 1 (e.g. broadcasted through a speaker). The local operator has presumably connected a microphone and speaker to these interfaces, but further daisy chaining is not precluded. The local scrambler 1 also accepts remote audio input 96 from the speech communication device 82 and produces remote audio output 97 for the local operator 201.

The local audio output 81 contains encrypted information, but this output is transformed to be "speech-like" in the sense that it shares many similar characteristics with human speech (i.e., it is in human audible range of 20 to 20,000 Hz). The communication local device 82 is connected to the scrambler 1 by standard audio interfaces. Analogously, the remote operator 202 holds a scrambler 22 and a speech communication device 84. The remote scrambler 22 accepts local audio input 89 from the remote operator 202. The remote operator 202 receives remote audio output 86 from the remote scrambler 22. The remote audio output 86 is based upon an unscrambling of the remote audio input 85.

The scrambler also receives local audio input 89 from the remote operator 202 and produces speech-like local audio output 95 for the speech communication device 84. The devices 82 and 84 are connected over a preexisting speech channel 8. In this fashion, the operators establish a secure speech communication channel with end-to-end encryption between the scramblers 1 and 22.

The scramblers 1 and 22 are identical in construction and behavior. As such, focus is on the construction of one of the scramblers, local scrambler 1. The qualifiers "local" and "remote" are only used when necessary. Nevertheless, it is important to remain aware of how the local scrambler 1 interacts with the remote scrambler 22.

Figure 2:
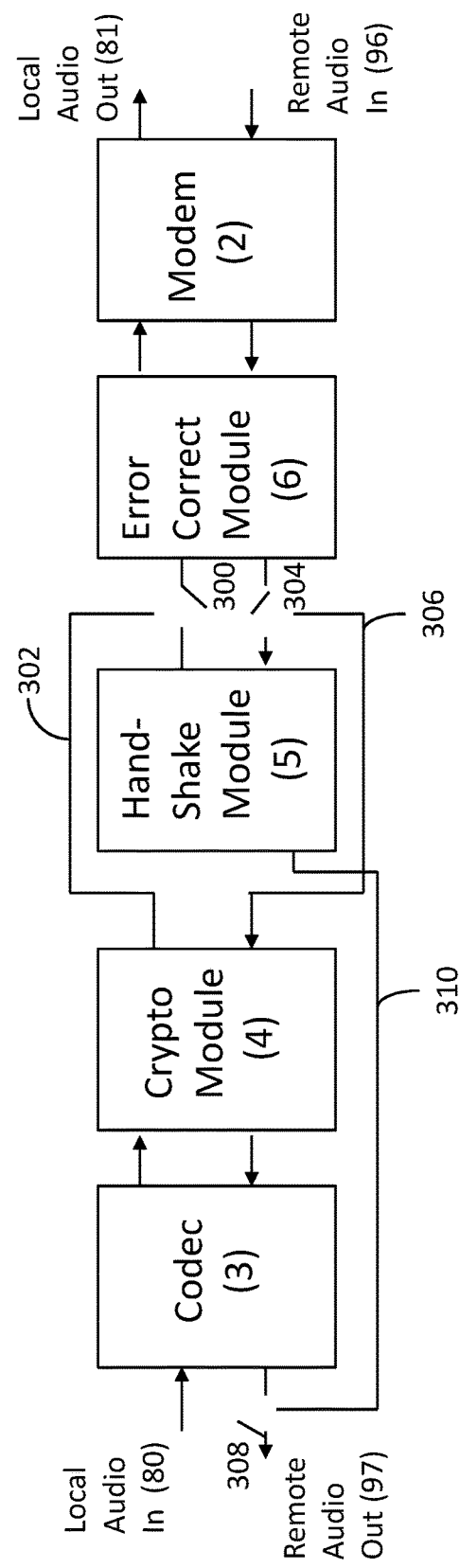
FIG. 2 illustrates a scrambler configured in accordance with an embodiment of the invention.

In order to construct the scrambler 1, novel use is made of several underlying components in both the way the components are combined and their parameters to facilitate high quality transmission. As shown in FIG. 2, the major components are a modem module 2, a codec module 3, a crypto module 4, a handshake module 5, and an error correction module 6.

The modem module 2 provides a mechanism for sending and receiving arbitrary digital data over the speech channel 8. The modem module 2 translates between messages of a fixed number of bits and messages of a fixed number of audio samples. The bit messages are communicated to the error correction module 6, and the sample messages are rendered and recorded at a fixed rate to and from the audio output 81 and input 96. This establishes a lossy communication mechanism over the speech channel 8. Messages sent over the speech channel 8 may be lost, damaged, and false messages may even be introduced.

The error correction module 6 provides a mechanism for alleviating possible damage that messages experience when they are transmitted over the speech channel 8 and decoded by the modem module 2. The error correction module operates in two directions. Messages sent from the crypto module 4 or the handshake module 5 are encoded into code words according to an error correcting code. Switch 300 is used to alternately connect to crypto module 4 via line 8 or to handshake module 5.

The error correction module 6 translates between messages of one fixed number of bits to messages of another, larger, fixed number of bits that include error correcting bits. In the opposite direction, messages sent from the modem module (2) are decoded by the error correction module 6. This establishes a mechanism to correct a limited number of damaged bits received from the modem module 2. Switch 304 alternately connects error correction module 6 output to the crypto module 4 via line 306 or to the hand shake module 5.

Together, the modem module 2 and error correction module 6 form a conceptually general purpose mechanism for digital data exchange over the speech channel 8. Their parameters must be specially tuned for optimal interaction with the other modules.

The scrambler 1 is always in one of two modes: handshake mode or call mode. When the scrambler 1 is first powered on, it begins in handshake mode. The configuration of the three switches 300, 304 and 308 is dictated by the mode of the scrambler. In handshake mode, the handshake module 5 is connected to the error correction module 6 and the modem module 2, while the codec module 3 and the crypto module 4 are disconnected from the error correction module 6. The handshake module 5 is also connected to the audio output 97 so that it may output audio cues to inform the operator 201 of the handshake status. Note that the audio input 80 is still flowing into to the codec module 3 and then into the crypto module 4, but because the output of the crypto module 4 is disconnected from the error correction module 6, the audio input 80 is effectively ignored and the behavior of the codec module 3 and the crypto module 4 in handshake mode is irrelevant.

When the handshake mode is first entered, the handshake module 5 constructs handshake data that consists of a fixed number of bits that include data used to perform a key exchange with the remote scrambler 22. In addition, checksum data is used so that the remote scrambler 22 can ensure that its received handshake data is not corrupt. Note that this checksum data is included regardless of the reliability of the modem module 2 and the error correction module 6 because it is essential that the correct handshake data is received. In the case of incorrect data, the handshake module 5 simply sends multiple copies of the same message until it can deduce that the remote scrambler 22 has correctly received the message. The modem 2 provides an alert when this has occurred. The handshake is potentially a multi-round process, but concludes with the local scrambler 1 holding a block cipher key (KEY), a short authentication string (STR), and two random block cipher nonces (SNONCE) and (RNONCE), all of which are shared with the remote scrambler 22. The block cipher key and the short authentication string are agreed upon in a secure fashion, but the block cipher nonces are agreed upon in the clear. The nonce correspondence is reversed between the local scrambler 1 and the remote scrambler 22. The local scrambler 1 chooses its SNONCE randomly and transmits it to the remote scrambler 22, which receives it as its RNONCE, and the remote scrambler 22 chooses its SNONCE randomly and transmits it to the local scrambler 1 which receives it as its RNONCE. The handshake then proceeds as a standard key exchange (with a small change, see below) with a Short Authentication String (SAS) from which a shared key (KEY) is then derived, while preventing man-in-the-middle attacks. The SAS protocol is a commonly used cryptographic protocol and can be found in works such as "Secure Communications over Insecure Channels Based on Short Authenticated Strings" by Serge Vaudenay in "Advances in Cryptology—CRYPTO 2005", Volume 3621 of the series Lecture Notes in Computer Science, pages 309-326. The handshake is enhanced by handling the synchronization problem; that is, because each party does not know when to initiate the handshake, the parties probabilistically start the handshake, check if the other party has responded properly, and if not, wait a small random amount of time before trying again.

Once the handshake is completed, and the operators have agreed on a key (KEY), the scrambler 1 then enters call mode, at which point the three switches in FIG. 2 all toggle, disconnecting the handshake module 5 and connecting the crypto module 4 to the error correction module 6. The local scrambler 1 remains in this mode until it detects the remote scrambler 22 attempting to perform a handshake, or the call times out, or the operator 201 presses a special reset button to force the scrambler 1 to enter handshake mode.

In call mode, the scrambler 1 conceptually separates into two independent flows of processing: the flow from the local audio input 80 from the operator 202 to the local audio output 81 for the device 84, and the flow from the remote audio input 96 from the device 84 to the remote audio output 97 for the operator 202. These process flows have no interaction with each other. This is in contrast to handshake mode, in which the handshake module 5 changes its output based on the input it is receiving from the remote scrambler 22.

The codec module 3 provides a mechanism for compressing the local audio input 80 from the operator 201 to a low bitrate digital form, and decompressing the remote audio output 97 for the operator 201. One reason why this compression is necessary is that raw, uncompressed audio is unsuitable for transmission over the speech channel 8 because of its high bitrate. The codec module 3 translates between messages of a fixed number of samples and messages of a fixed number of bits. Audio signal from the local audio input 80 is sampled at a fixed rate, and converted to digital messages of a fixed number of bits before being sent to the crypto module 4. Digital messages of a fixed bit length received from the crypto module 4 are converted to an audio signal at a fixed sample rate and are sent to the audio output 97.

The crypto module 4 provides a mechanism for encrypting the messages received from the codec module 3 and decrypting the messages received from the error correction module 6.

The crypto module 4 utilizes a block cipher, parameterized with the block cipher key (KEY) from the handshake, for encryption and decryption. For simplicity, assume that the block size of the block cipher is at least as large as the size of the message received from the codec module 3, although this is not strictly required. The block cipher is used in counter mode with a nonce, and the encryption and decryption directions each use their own distinct nonce and counter.

The encryption direction of the crypto module 4 uses the nonce (SNONCE) as its nonce and begins with a counter (CTR) value initially set to zero. Upon receiving a message, M, from the codec module 3, the crypto module 4 creates a "blind" R=Enc(KEY, nonce xor CTR). Then creates the encrypted message, C=M xor R. If the blind R is longer than M, the extra bits of R are discarded. A fixed number, (K), of the low bits of the counter are then appended to the message, and finally the counter is incremented in preparation for the next message. Thus, the final message sent to the error correction module 6 is the encrypted codec message joined with the low bits of the counter that was used to encrypt it.

The decryption direction of the crypto module 4 uses the nonce (RNONCE) as its nonce and has its counter dictated by the messages received from the error correction module 6. Recall that the receiver's RNONCE is equal to the sender's SNONCE. For each received message, the same fixed number of trailing bits of the message is used to set the counter value. As above, a blind, R, is calculated as R=Enc (KEY, nonce xor CTR), and the codec portion of the message, C, is then decrypted by xoring it with R. Decryption succeeds because M=C xor R. As above, if the blind R is longer than C, the extra bits of R are discarded.

This scheme implements the standard block cipher Counter Mode (CTR), which can be found in. e.g., NIST Special Publication 800-38A 2001 Edition "Recommendation for Block Cipher Modes of Operation" by Morris Dworkin. Because the counter is incremented by the encryption direction, no two messages transmitted over the speech channel 8 will ever be encrypted with the same counter. The decryption direction may mistakenly attempt to decrypt incoming messages with a repeated counter, but this is harmless. The counter must be repeatedly transmitted because the unreliability of the speech channel 8 makes it so that the remote scrambler 22 cannot reliably deduce the proper counter value by counting by itself.

There is, however, one limitation to this implementation: because the transmitted counter is truncated to a fixed number of bits, the number of encrypted messages that can be successfully decrypted by the remote scrambler 22 is limited. More specifically, if the counter is truncated to n bits before transmission, the remote scrambler 22 can only decrypt the first $2^n$ messages. Further messages will have been encrypted with a counter of more than n bits, and hence the truncated counter received by the remote scrambler 22 will be missing some bits. This defines the "call timeout" mentioned above. The crypto module 4 is constructed to detect the approximate time of the call timeout and switches the scrambler 1 back to handshake mode. In practice, this means that a lengthy call must periodically perform a new handshake.

Once a key is established, the local audio input 80 is sampled by the codec 3. The codec is parameterized by the samples per frame (SPF, measured in samples/frame), bits per frame (BPF measured in bits/frame), and sample rate (SR measured in samples/sec), which completely determine bits per frame (BPF, measured in bits/frame) and bits per sec (BPS, measured in bits/sec), where the relationship is: BPS=BPF*SR/SPF.

This codec frame of size BPF is then fed into the crypto module 4 which produces the ciphertext (of size M, measured in bits), and counter information (CTR) (of size K, measured in bits). A number of these bits (P) is fed into the error correction module 6 to increase tolerance to channel noise, before the frame is fed into the modem 2. The modem has parameters: bits per frame (MBPF measured in bits/ modemframe) and samples per frame (MSPF measured in samples/modemframe) and samples per second (LR measured in modemsamples/second) transmitted on channel 8. These are properties inherent with any modem; however, parameters are chosen to successfully interplay with other parameters. The receiver reverses these steps in order to decode the audio, first demodulating 2, then error decoding 6, then decrypting 4, then audio decoding 3 to generate the remote audio output 86.

The quality of the local audio input 80 into channel 8 is fixed to the least common denominator of 8000 samples/sec, i.e. SR=LR=8000 samples/sec. In addition to developing a scheme that allows digitally encrypted voice to pass through a noisy channel 8 implementing aggressive filtering, another novelty in the invention is that that it provides a means for the simultaneous tuning of parameters to establish the following workflows:

(201)→(80)→(3)→(4)→(6)→(2)→(81)→(82)→(8)→(84)
→(85)→(2)→(6)→(4)→(3)→(86)→(202)
(201)←(97)←(3)←(4)←(6)←(2)←(96)←(82)←(8)←(84)
←(95)←(2)←(6)←(4)←(3)←(89)←(202)

Human-understandable audio fidelity is maintained. This includes tuning the codec BPS to roughly 1200 bits/sec, thereby inducing a relationship between BPF and SPF, which are chosen so that BPF fits into the input of an encryption scheme, producing M+K bits as output, which is then fed into the error correction scheme implemented by the error correction module 6. The error correction module takes plaintext messages of length M+K and encodes them using an [N,M+K,D] code of length N and minimum distance D. N must then be equal to MBPF, and MSPF must be at most some divisor of (but preferably equal to) the sample rate of 8, which is 8000 samples/sec as mentioned above.

Prior art approaches combine elements 2-6 of FIG. 2 to work across an environment and channel 8. However, these prior efforts focused mostly on designing and optimizing one component, typically the modem 2, instead of the disclosed simultaneous combination and tuning of parameters. Note that services such as RedPhone or Silent Circle are different in that they are software services and not standalone hardware devices that plug into any audio channel. Furthermore, dedicated hardware devices such as the cryptophone and various secure-phones are also different since they are not plug-and-play with any audio device.

For additional overall quality (audio fidelity/bandwidth tradeoff) in the case where the channel 8 can tolerate more bandwidth (such as over a digital channel), one can further increase the MBPF, which in turn allows one to increase N the error correction parameter of the error correction module 6, which in turn allows for an increase in the size of the ciphertext output M+K of the crypto module 4. The frame of the modem 2 can support N bits, and the underlying encryption scheme (of the crypto module 4, viewed as a block cipher in CTR mode) outputs M bits with a K-bit counter, then one can apply an error correction module 6 with parameters [N,P,D] where the distance parameter D is as high as possible, where P is the number of protected bits is also tuned to be as high as possible. For example, P=K protects the shorter, but more critical counter bits.

The quality (audio fidelity/bandwidth tradeoff) can be further enhanced by exploiting the homomorphic properties of the codec 3 and the crypto module 4, in particular their resilience against bit-flipping errors. Namely, codec 3 is chosen so that Decode(Encode(x) XOR error) acoustically sounds like x, and Decrypt(Encrypt(x) XOR error)=x XOR error. In other words, the codec is configured such that decoding of a remote encrypted audio input signal and a logical XOR of error bits produces an acoustic signal corresponding to the remote audio output signal.

One implementation of the scrambler 1 uses the following choices. The reasoning for these choices is so that the invention works over the widest possible variety of audio sources and channels 8 which there is no control over. Modem 2 uses the (Frequency Division Multiplex Digital Voice) FDMDV modem that is modified to have a more voice-like carrier signal, i.e., set center frequency to be closer to the human voice frequency range. In another embodiment of our invention, one can also use a stronger custom modem. Codec 3 uses "Codec2", which already sets certain parameters and internally uses an error correcting code (ECC) independent of error correction module 6 for enhancing the quality of certain bits within a frame. Codec2 forces SR=8000 Hz and has a variety of BPS: 450, 1200, 1300, 1400, 1600, 2400, or 3200 bit/s. In one embodiment, we set BPS=1200 and SPF=320, BPF=48 as in Codec2. Crypto module 4 uses the Advanced Encryption Standard (AES) in counter mode, with a 128-bit key and 16-bit counter (a new key and IV will need to be chosen periodically). Alternative stream ciphers are also applicable. Handshake module 5 uses either a Public-Key Infrastructure (PKI)/preshared key handshake, or a Short Authenticated String (SAS) handshake (see "Secure communications over insecure channels based on short authenticated strings" by Serge Vaudenay, Advances in Cryptology-CRYPTO 2005). Error correction module 6 uses the standard Golay23 code which is a [23,12,7] code or the trivial identity code, which is a [1,1,0] code. One can use stronger or weaker error correcting codes.

Consider a one-way communication where Alice has a scrambler, Bob has a descrambler, and Alice and Bob have previously agreed to some stream cipher parameters.

Alice's voice is constantly sampled at a fixed rate by a sound card that is part of the scrambler. A normal rate might be 8000 samples per second. Each sample is simply a real number in [−1,+1] that represents the amplitude of the sound wave. The sound card constantly writes these samples to a buffer, which the scrambler software has access to. It is important to note that the sound card runs independently of the software; the software does not "drive" the sound card.

The software partitions these samples into fixed size segments called frames. A normal frame size might be 320 samples, or 40 milliseconds at the aforementioned rate of 8000 samples per second. Each frame is then fed through the codec, which lossly encodes the frame as a fixed number of bits. A typical frame size might be 48 bits. Each frame is then encrypted with a stream cipher, which does not change the number of bits.

Next, bits may optionally be appended, or bits may overwrite part of the encrypted codec bits if needed for stream cipher synchronization purposes. For example, if using a block cipher in counter mode, these bits could be, say, the low 16 bits of the counter CTR used to encrypt this frame. Even more bits may optionally be appended for forward error correction purposes.

At this point one has a frame that consists of some encrypted codec bits, some stream cipher synchronization bits, and some forward error correction bits. This resulting frame is set to another fixed size, which is then fed through the modem. A typical frame size might be 64 bits, which allows 16 more bits than the aforementioned 48-bit codec frame size. The modem losslessly encodes the bits back to another fixed number of samples. A typical frame size might again be 320 samples, or 40 milliseconds at the aforementioned 8000 samples per second.

Finally, these samples are written to another buffer that is picked up by the same sound card, but this time for playback purposes. Again, the software does not "drive" the sound card here either; it is an independently running entity.

The sound wave is then recorded by the assumed speech device and transmitted over the channel to Bob. Bob's descrambler then repeats this whole process (but in reverse), and of course making use of any forward error correction bits and stream cipher synchronization bits. Bob then hears Alice's voice through his speaker.

We now go over the individual components in more detail. First, we discuss the modem. The abstract model the modem provides is as follows. The modulator transmits frames of fixed bit size over the speech channel, and the demodulator receives frames of the same size. Unfortunately, there are no guarantees about the correctness of the received frames. Frames may be lost, bits within frames may be flipped, and false frames may even be inserted.

The modem 2 is a sophisticated component that requires a lot of digital signal processing experience to design and implement. The design of the modem must be specialized for the type of channel over which it is intended to be used. A digital service like Skype® has different characteristics than a plain old telephone service. When a plain old telephone service degrades, the signal quality drops but the overall signal remains continuous. When a digital service degrades, the signal quality might drop slightly depending on the particular service, but it is usually the case that the signal starts to jitter, which cuts out bits and pieces of the signal. This is highly problematic for a modem, which must now spend time resynchronizing itself to the signal, losing data in the process.

Although the Codec2 modem creates frames in the voice spectrum of 0 to 4000 Hz, which is exactly what we need for our purposes, it is not designed to be transmitted over a speech channel, and certainly not over a digital speech channel. It is designed to be further modulated and demodulated over a high frequency radio channel. A better modem means that one can transmit more bits per second, which directly translates into higher quality and more reliability. This cannot be overstated: all of the other components are directly dependent on the strength of the modem. Another difficulty is to make the modem work through noise suppression algorithms that are built into some speech channels, such as Skype®.

Next, we discuss the codec 3. The abstract model is simple: a fixed number of samples are converted to a fixed number of bits and vice versa. The only subtle detail is that, because the modem will never be perfect, the codec needs to support being fed incorrect bits. Codec2 supports this, but it is unknown if other speech codecs support this. However, this is not the bottleneck for the codec.

The bottleneck for the codec is its quality. A typical speech channel for encrypted data has a maximum information rate of 64000 bit/s. This is somewhat overestimating things because these bits are derived by compressing a waveform expecting it to be speech—they are not just random bits. Furthermore, the actual quality encountered could be as low as even 8000 bit/s. Because of this, we are highly constrained in the quality that we can use for the codec.

At the time of this writing. Codec2 is the only free codec available that has bit rates as low as 1200 bit/s (and even 450 bit/s in its development source branch). Unfortunately, 1200 bit/s produces about the poorest quality speech that would be acceptable to a layman. 450 bit/s would likely be unacceptable, as it produces very robotic sounding speech that requires effort to understand. Other free codecs like Opus and Speex (Opus is a free codec released by the Xiph.org Foundation, a non-profit organization that focuses on multimedia, standardized by the Internet Engineering Task Force (IETF) RFC 6716, and Speex is considered to be its predecessor that can be found in RFC 5574) do not go below 4000 bit/s, and it is unknown if they support incorrect bits as previously stated.

In our testing, we have found that simply omitting forward error correction entirely, instead using those bits to include stream cipher synchronization information every frame, is generally better than using forward error correction and sending only occasional stream cipher synchronization. This is likely because error correction works well in the "analog" world where signals become weak but stay continuous, but in the "digital" world where signals stay reasonably strong but instead start to jitter, it is more important to have fast stream cipher synchronization.

The encryption is actually the most straightforward part, except of course for the initial handshake. The idea of one possible embodiment of our invention is to simply use a block cipher in counter mode, and the scrambler dictates the CTR to the descrambler. One possible implementation is to send the low 16 bits of the CTR inside every frame. Although the block size is certainly going to be larger than the data being encrypted each frame (the codec frame size), one can simply discard many bits of the keystream for the sake of conveniently incrementing the CTR on every frame. One can get away with this because the amount of data that is encrypted is tiny. In one embodiment, 1200 bits per second are encrypted using only 48 bits (Codec2 frame size) of each 128-bit AES keystream block. AES is so fast, even on a device like the raspberry pit, that this raises no performance concerns.

The only other possibility for the encryption would be to use those CTR bits instead for FEC to protect the encrypted codec bits, and then use CFB mode with the cipher. However, this would provide very weak security. Because the codec frame size is small, one would be truncating the ciphertext feedback to roughly 48 bits, which is unacceptable. And even then, it would be questionable whether or not one would have that many bits correct often enough to not produce garbage. A 16-bit CTR, on the other hand, with 40 millisecond frames, offers approximately 40 minutes of call time before a new handshake is forced.

Now we describe the handshake. The abstract idea is as follows. Alice and Bob just want to perform an ephemeral exchange that produces a shared short authentication string and a shared cipher key. In addition, at the end of the handshake, Alice's scrambler should choose a random nonce for the counter mode and transmit it to Bob's descrambler, and Bob's scrambler to Alice's descrambler. In this way, although there is only one block cipher key, there are actually two distinct "sessions" that are running with the block cipher. Alice's scrambler and Bob's descrambler share a nonce, and Alice's scrambler dictates its CTR to Bob's descrambler. Likewise, Bob's scrambler and Alice's descrambler share a different nonce, and Bob's scrambler dictates its CTR to Alice's descrambler.

The implementation details of the handshake are more complex. Because the handshake is likely going to be symmetric, and because the modem communication is very lossy, the handshake algorithm has to be complex. The basic idea is that both Alice and Bob want to repeatedly broadcast all of the information that the opposite party might require at the moment, using the information that they have received from the opposite party to deduce what step the opposite party could be at within the handshake process. In addition, each party will likely have to fall back to the beginning of the handshake if they get stuck at some step for too long, else deadlocks may arise. Furthermore, once a handshake is complete and a call is entered, communication changes to one-way, where Alice fires-and-forgets data to Bob and vice versa. In this case, there must be a way for the scrambler to detect that the remote side is trying to start a new handshake, and there must also be a way for the human operator to force the scrambler to reset to handshaking.

There is one final problem worth mentioning, which is that some speech channels might not provide full duplex. In other words, both parties cannot simultaneously talk to each other. In particular, this may be the case with mobile phones when the quality is low or the network is congested. This causes problems with a naive solution that assumes that both scramblers can constantly transmit modem signals to each other.

In one possible embodiment of the invention, each scrambler only transmits a modem signal when it detects voice activity, but otherwise transmits silence. Unfortunately this causes problems with the modem, because the demodulator is forced to take time to synchronize itself to an intermittent modulator signal. To address this, a local latency is introduced so that when Alice speaks into her scrambler, the scrambler prepends something on the order of 500 milliseconds of silence to Alice's speech blurb. This gives the receiving demodulator some time to synchronize itself before the actual speech data arrives. In the absence of this, every time Alice spoke, the first 500 milliseconds of her speaking would simply be cut off for Bob, because his demodulator is using those initial 500 milliseconds to synchronize itself, during which time it is producing incorrect data.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A hardware module, comprising:
a plug of a voice scrambler to interface with an audio channel of a speech communication device; and
the voice scrambler configured to
receive a local audio input signal and form an encrypted audio output signal in a human audible range that is applied to the audio channel of the speech communication device, wherein the local audio input signal is first encrypted and subsequently encoded with an error correction code and is transformed into the encrypted audio output signal that lies in a human voice frequency range and is minimally altered by packet switch network filters, and
receive a remote encrypted audio input signal in the human audible range and form a remote audio output signal corresponding to the remote encrypted audio input signal so that an original audio signal from a remote operator can be decrypted and recovered by the voice scrambler.

2. The hardware module of claim 1 wherein the voice scrambler includes a codec to receive the local audio input signal at a fixed sample rate per frame and produce a local audio input signal at a fixed number of bits per frame.

3. The hardware module of claim 2 wherein the fixed number of bits per frame is sampled at approximately 1200 bits per second.

4. The hardware module of claim 1 wherein the voice scrambler includes a codec to receive a remote audio output signal at a fixed number of bits per frame and produce a remote audio output signal at a fixed sample rate per frame.

5. The hardware module of claim 1 wherein the voice scrambler includes a codec configured such that decoding of the remote encrypted audio input signal and a logical XOR of error bits produces an acoustic signal corresponding to the remote audio output signal.

6. The hardware module of claim 1 wherein the voice scrambler includes a codec configured for a sample rate of approximately 8000 Hz.

7. The hardware module of claim 1 wherein the voice scrambler includes a codec configured to utilize error correcting code.

8. The hardware module of claim 1 wherein the voice scrambler includes a crypto module to form the encrypted audio output signal and decrypt the remote encrypted audio input signal.

9. The hardware module of claim 8 wherein the crypto module utilizes a block cipher parameterized with a block cipher key obtained during a handshake operation with a remote hardware module.

10. The hardware module of claim 8 wherein the crypto module produces ciphertext and counter information.

11. The hardware module of claim 1 wherein the voice scrambler includes a handshake module configured to execute data exchange with a remote hardware module to produce a shared short authentication string and a shared cipher key.

12. The hardware module of claim 11 wherein the handshake module is configured to share a nounce with the hardware module and the remote hardware module, hold a distinct nounce and process counter values from the remote hardware module.

13. The hardware module of claim 1 wherein the voice scrambler includes an error correction module configured to translate messages of a first fixed number of bits per message to messages of a second fixed number of bits per message that include error correcting bits.

14. The hardware module of claim 1 wherein the voice scrambler includes a modem with a center frequency corresponding to human voice frequency range.

15. The hardware module of claim 1 wherein the voice scrambler includes a modem configured for Frequency Division Multiplex Digital Voice.

* * * * *